(12) United States Patent
Tachibana et al.

(10) Patent No.: US 8,485,394 B2
(45) Date of Patent: Jul. 16, 2013

(54) BEVERAGE DISPENSER

(75) Inventors: Yoshihisa Tachibana, Tokyo (JP);
Takashi Nishiyama, Tokyo (JP);
Kazuhide Saito, Osaka (JP); Kazuaki Mizukami, Osaka (JP); Hiroyuki Hashimoto, Osaka (JP); Hiroshi Yamamoto, Osaka (JP)

(73) Assignee: The Coca-Cola Company, Atlanta, GA (US)

( * ) Notice: Subject to any disclaimer, the term of this patent is extended or adjusted under 35 U.S.C. 154(b) by 212 days.

(21) Appl. No.: 12/990,661

(22) PCT Filed: Apr. 22, 2009

(86) PCT No.: PCT/JP2009/001834
§ 371 (c)(1),
(2), (4) Date: Nov. 2, 2010

(87) PCT Pub. No.: WO2009/136474
PCT Pub. Date: Nov. 12, 2009

(65) Prior Publication Data
US 2011/0042414 A1    Feb. 24, 2011

(30) Foreign Application Priority Data

May 9, 2008    (JP) .................................. 2008-123270

(51) Int. Cl.
*B67D 7/74*    (2010.01)
*B67D 7/80*    (2010.01)
(52) U.S. Cl.
USPC ................... 222/129.1; 222/146.1; 222/146.6
(58) Field of Classification Search
USPC .......... 222/129.1–129.4, 145.6, 146.6, 146.1, 222/189.07–189.11, 190; 261/DIG. 7
See application file for complete search history.

(56) References Cited

U.S. PATENT DOCUMENTS

| | | | | |
|---|---|---|---|---|
| 2,880,912 A | * | 4/1959 | Fisher | 222/129.4 |
| 3,583,601 A | * | 6/1971 | Ayers | 222/1 |
| 4,201,558 A | * | 5/1980 | Schwitters et al. | 62/70 |
| 4,211,342 A | * | 7/1980 | Jamgochian et al. | 222/129.4 |
| 4,300,923 A | * | 11/1981 | Skoli et al. | 96/218 |
| 4,649,809 A | * | 3/1987 | Kanezashi | 99/290 |
| 4,761,295 A | * | 8/1988 | Casey | 426/549 |
| 5,140,832 A | * | 8/1992 | Deininger et al. | 62/389 |

(Continued)

OTHER PUBLICATIONS

International Search Report and Written Opinion from the Japanese PTO for International Application No. PCT/JP2009/001834, Date:Jun. 2, 2009.

*Primary Examiner* — Paul R Durand
*Assistant Examiner* — Vishal Pancholi
(74) *Attorney, Agent, or Firm* — Sutherland Asbill & Brennan LLP

(57) ABSTRACT

To provide a beverage dispenser capable of appropriately and smoothly supplying a carbonated beverage as a supercooled beverage. According to the present invention, there is disclosed a beverage dispenser including a carbonator 51 for manufacturing carbonated water; a beverage supply circuit 7 for supplying a carbonated beverage manufactured by the carbonator 51 to the outside; a heat exchanger 16 for supercooling; and a primary cooling device 13, the carbonator 51 mixes a carbonic acid gas supplied from a gas regulator 54 which supplies a pressurized carbonic acid gas, syrup and diluting water to manufacture the carbonated beverage, and the heat exchanger 16 for supercooling cools the carbonated beverage flowing through the beverage supply circuit 7 into a supercooled state at a temperature of a solidifying point or less to release the supercooled state in the outside.

17 Claims, 5 Drawing Sheets

U.S. PATENT DOCUMENTS

| | | | | |
|---|---|---|---|---|
| 5,499,741 A * | 3/1996 | Scott et al. | | 222/95 |
| 5,749,233 A * | 5/1998 | Adolfsson | | 62/50.2 |
| 6,260,477 B1 * | 7/2001 | Tuyls et al. | | 99/323.2 |
| 6,276,150 B1 * | 8/2001 | Nelson | | 62/177 |
| 6,301,918 B1 * | 10/2001 | Quartarone et al. | | 62/342 |
| 6,312,589 B1 * | 11/2001 | Jarocki et al. | | 210/87 |
| 6,698,229 B2 * | 3/2004 | Renken et al. | | 62/390 |
| 6,725,687 B2 * | 4/2004 | McCann et al. | | 62/389 |
| 6,981,387 B1 * | 1/2006 | Morgan | | 62/390 |
| 7,320,414 B2 * | 1/2008 | Davis | | 222/129.1 |

* cited by examiner

BEVERAGE DISPENSER

TECHNICAL FIELD

The present invention relates to a beverage dispenser which supplies a carbonated beverage brought into a supercooled state at a solidifying point or less and which releases the supercooled state in the outside to manufacture a sherbet-like carbonated beverage.

BACKGROUND ART

Heretofore, in a beverage dispenser which supplies a beverage to a cup and the like, a syrup supply line is drawn from a tank filled with a syrup as a beverage ingredient, and a diluting water supply line is also provided which dilutes the syrup at a predetermined ratio. In these syrup supply line and diluting water supply line, a syrup cooling coil and a diluting water cooling coil are interposed, respectively. These coils are immersed into a water tank in which cooling water is stored to cool the syrup and the diluting water flowing through the coils to a predetermined temperature. In consequence, the syrup and the diluting water cooled at the predetermined cooling temperature are mixed at nozzles, respectively, and discharged as a targeted beverage to the cup.

The beverage supplied by the above-mentioned constitution is all stored in the cup in a liquid state. Therefore, ice pieces are separately put into the cup to serve the beverage to a customer in a state in which the beverage can be maintained at a constant cooling temperature for a certain degree of time.

However, when the ice pieces are supplied to the cup, the only beverage around the floating ice pieces is cooled owing to heat of fusion. Therefore, it is difficult to uniformly cool the whole beverage in the cup. Moreover, as the ice pieces melt, the concentration of the beverage decreases. It has therefore been difficult to serve the beverage in an appropriately cooled state.

To solve the problem, heretofore, a device has been developed in which the beverage to be served is cooled to a temperature of or below a solidifying point of the beverage to discharge the beverage to the cup as it is in a supercooled state, whereby the beverage is immediately phase-changed to ice owing to impact during the discharging to serve a sherbet-like beverage (see Patent Document 1).

CITATION LIST

Patent Literature

PTL 1: Japanese Patent Application Laid-Open No. 2001-325656

SUMMARY OF INVENTION

Technical Problem

In a case where the supercooled carbonated beverage is manufactured using the above-mentioned device, it is considered that an ingredient to be diluted such as a syrup which is the raw material of the carbonated beverage and the diluting water are brought into a supercooled state in heat exchangers for supercooling provided in separate supply circuits, and mixed in a nozzle constituting a carbonated beverage supply port to supply the carbonated beverage to a container such as a cup arranged in the outside.

In this case, the viscosity of an ingredient to be diluted such as the syrup excessively increases at a low temperature, so that it has been difficult to mix the syrup with the diluting water having the supercooled state at the nozzle. Moreover, an ingredient to be diluted such as the syrup is vitrified and solidified at an excessively low temperature, and hence a problem that the serving of the beverage cannot be realized sometimes occurs.

The present invention has been developed to solve the conventional technical problem, and an object thereof is to provide a beverage dispenser capable of appropriately and smoothly supplying the carbonated beverage as a supercooled beverage.

Solution to Problem

A beverage dispenser according to the present invention is characterized by comprising: a carbonator which manufactures carbonated water; a beverage supply circuit which supplies a carbonated beverage manufactured by the carbonator to the outside; and cooling means. The carbonator mixes a carbonic acid gas supplied from a carbonic acid gas source which supplies a pressurized carbonic acid gas, an ingredient to be diluted and diluting water to manufacture the carbonated beverage, and the cooling means cools the carbonated beverage flowing through the beverage supply circuit into a supercooled state at a temperature of a solidifying point or less to release the supercooled state in the outside.

The beverage dispenser of a second invention is characterized in that in the above invention, the cooling means includes a heat exchanger for supercooling which cools the carbonated beverage flowing through the beverage supply circuit into the supercooled state at the temperature of the solidifying point or less, and a primary cooling device, and the primary cooling device cools the carbonator to an ice point or so.

The beverage dispenser of a third invention is characterized in that the above invention further comprises: a diluted ingredient supply circuit which supplies the ingredient to be diluted to the carbonator; and a diluting water supply circuit which supplies the diluting water to the carbonator, wherein the primary cooling device cools, to the ice point or so, the ingredient to be diluted in the diluted ingredient supply circuit and the diluting water in the diluting water supply circuit.

The beverage dispenser of a fourth invention is characterized in that in the above invention, a supply pressure from the carbonic acid gas source to the carbonator is varied.

Advantageous Effects of Invention

According to the present invention, the beverage dispenser comprises: a carbonator which manufactures carbonated water; a beverage supply circuit which supplies a carbonated beverage manufactured by the carbonator to the outside; and cooling means. The carbonator mixes a carbonic acid gas supplied from a carbonic acid gas source which supplies a pressurized carbonic acid gas, an ingredient to be diluted and diluting water to manufacture the carbonated beverage, so that the carbonator can secure a space required for mixing these carbonic acid gas, ingredient to be diluted and diluting water. In consequence, the carbonated beverage can efficiently be manufactured with a predetermined concentration of the ingredient to be diluted and a predetermined gas volume value.

Moreover, the carbonic acid gas, the ingredient to be diluted and the diluting water are simultaneously mixed by the carbonator, so that any special means for mixing the ingredient to be diluted and the diluting water does not have to be provided, and the carbonated beverage having a predetermined concentration can precisely be manufactured.

Furthermore, the carbonated beverage manufactured as described above and flowing through the beverage supply circuit can be cooled by the cooling means into a supercooled state at a temperature of a solidifying point or less to release the supercooled state in the outside. In consequence, owing to impact in a case where the carbonated beverage brought into the supercooled state is injected into a container such as a cup in the outside, the beverage can immediately be phase-changed to ice, and the beverage can be supplied in a sherbet state which is a finally served state.

According to the second invention, in addition to the above invention, the cooling means includes a heat exchanger for supercooling which cools the carbonated beverage flowing through the beverage supply circuit into the supercooled state at the temperature of the solidifying point or less, and a primary cooling device, and the primary cooling device cools the carbonator to an ice point or so. In consequence, the carbonated beverage cooled to the ice point or so by the carbonator is cooled to the solidifying point or less of the beverage in the heat exchanger for supercooling, whereby the carbonated beverage can efficiently be cooled into the supercooled state at the solidifying point or less.

According to the third invention, in addition to the above invention, the beverage dispenser further comprises: a diluted ingredient supply circuit which supplies the ingredient to be diluted to the carbonator; and a diluting water supply circuit which supplies the diluting water to the carbonator, and the primary cooling device cools, to the ice point or so, the ingredient to be diluted in the diluted ingredient supply circuit and the diluting water in the diluting water supply circuit. In consequence, the temperature of the ingredient to be diluted and the diluting water to be supplied to the carbonator can be set to the ice point or so, and temperature conditions in the carbonator can be constant. Therefore, a supply pressure from the carbonic acid gas source to the carbonator is set to a constant pressure, whereby the carbonated beverage having a predetermined gas volume can appropriately be manufactured.

In consequence, the gas volume of the carbonated beverage can be set to a constant volume, so that it is possible to avoid in advance a disadvantage that bubble is generated in the carbonated beverage to form an ice nucleus and that the supercooled state is released in the heat exchanger for supercooling to cause freezing, in a process in which the beverage is cooled to a temperature of the solidifying point or less in the heat exchanger for supercooling.

According to the fourth invention, in the above invention, the supply pressure from the carbonic acid gas source to the carbonator is varied, so that the gas volume value of the carbonated beverage manufactured in the carbonator can arbitrarily be changed.

Therefore, the gas volume value of the carbonated beverage in the sherbet state as the finally served state can be changed, and the diversification of the beverage to be served can be realized.

DESCRIPTION OF EMBODIMENTS

Next, a beverage dispenser 1 as the embodiment of the present invention will be described in detail with reference to the drawings. The beverage dispenser 1 according to the present embodiment is a dispenser for use in a restaurant, a coffee shop or the like, and is a device which supplies a targeted beverage such as a strongly or weakly carbonated drink or a non-carbonated drink in a supercooled state and which serves a sherbet-like beverage in a container such as a cup.

EXAMPLES

Figure 1:
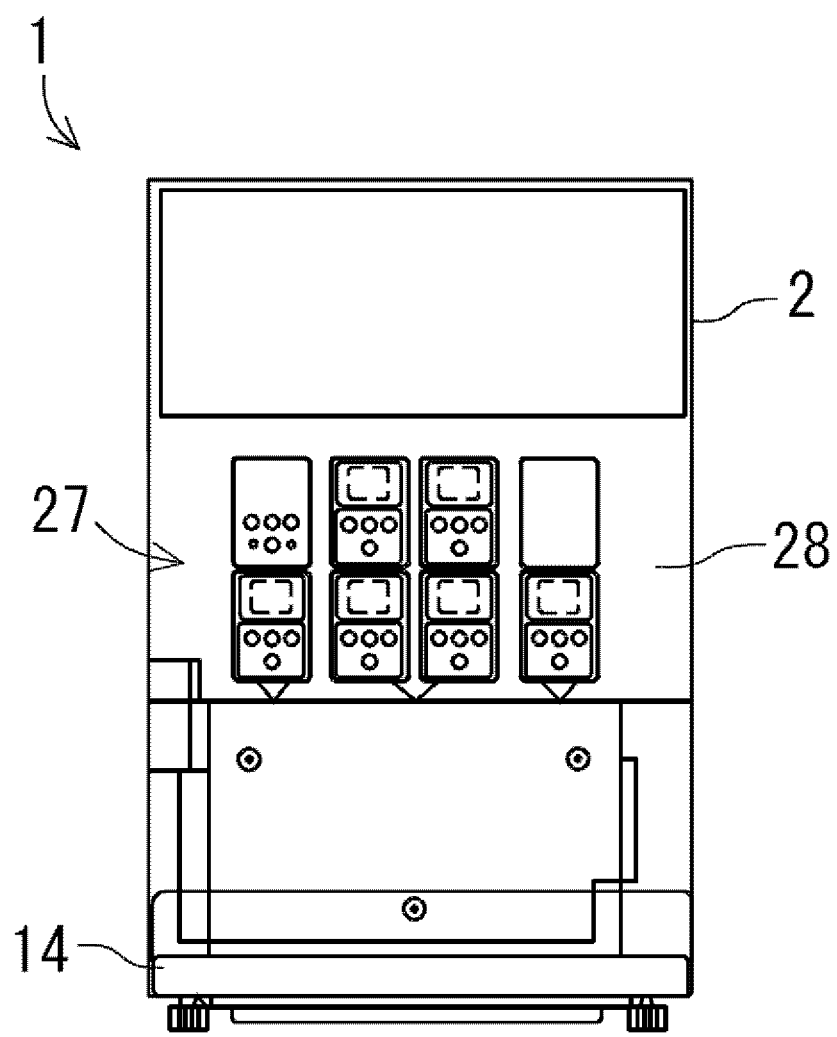
FIG. 1 is a front view of a main body of a beverage dispenser according to the present invention.
Figure 2:
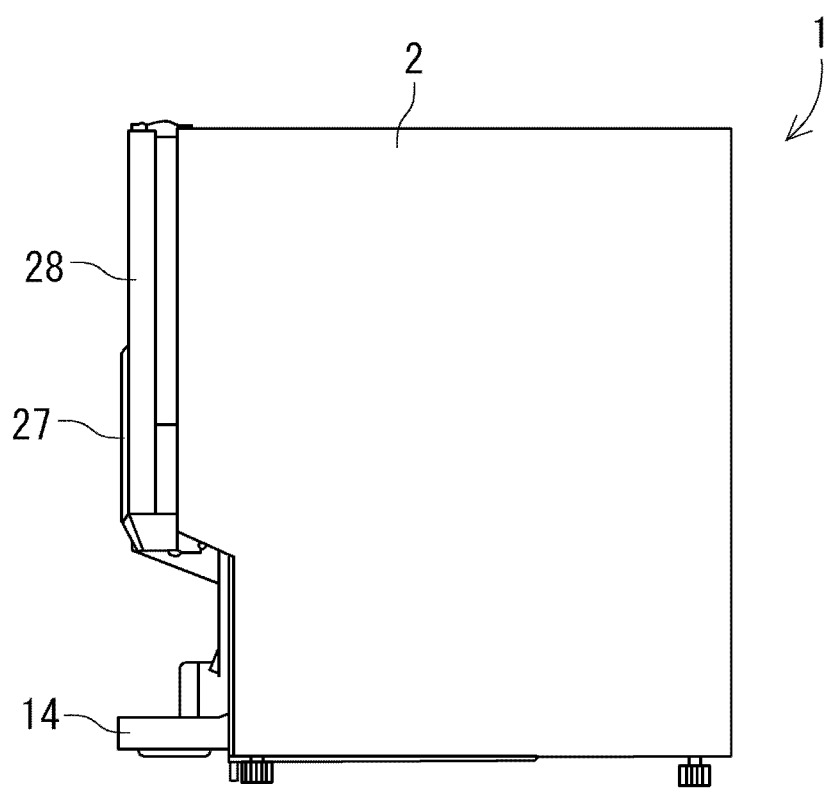
FIG. 2 is a side view of the main body of the beverage dispenser.
Figure 3:
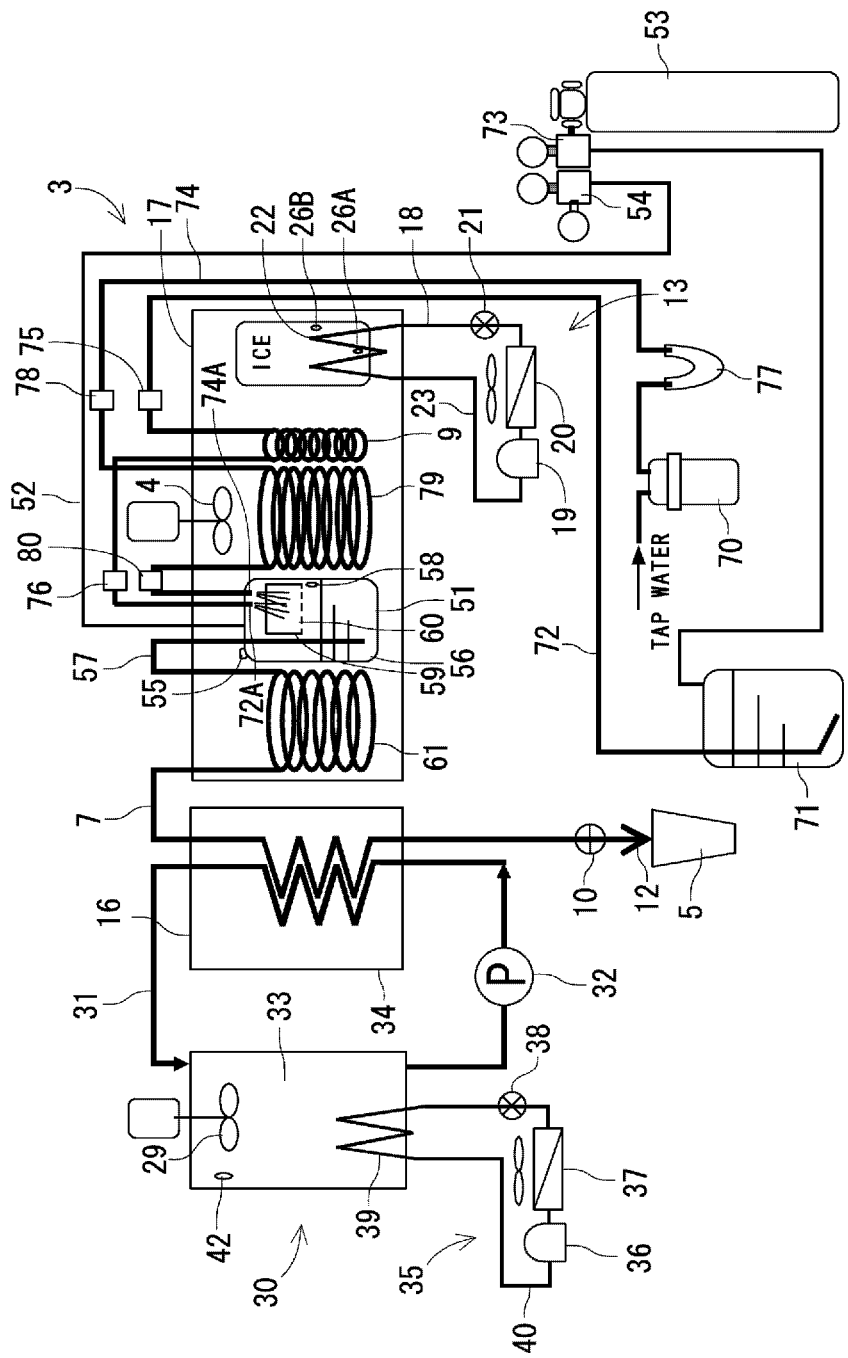
FIG. 3 is a schematic constitution diagram of the beverage dispenser.

First, the beverage dispenser 1 will be described in detail with reference to FIGS. 1 to 3. FIG. 1 is a front view of a main body 2 of the beverage dispenser 1 in which the present invention is utilized, FIG. 2 is a side view of the main body 2 of the beverage dispenser 1, and FIG. 3 is a schematic constitution diagram of the beverage dispenser 1.

The ingredients of the carbonated beverage to be served by the beverage dispenser 1 of the embodiment include a carbonic acid gas, an ingredient to be diluted such as syrup which is a sugar-containing ingredient to be diluted (or a diluted ingredient obtained by diluting a powder-like ingredient with a solution for dissolution), and diluting water. It is to be noted that the ingredient to be diluted and the diluting water will collectively be referred to as the beverage ingredients.

At the front surface of an openable/closable door 28 of the main body 2, an operating section 27 for operating beverage serving from a beverage supply unit 3 described later is provided, and the section is provided with operation buttons for selecting a beverage supply amount or a beverage supply method for each beverage to be supplied from the beverage supply unit 3. The operating section 27 is connected to a control device C described later in detail.

Moreover, a nozzle 12 (shown in FIG. 3) for discharging the beverage from the beverage supply unit 3 is provided at the lower rear portion of this openable/closable door 28, and a table 14 is provided under the nozzle 12. On the table 14, a cup 5 can be arranged as a container for receiving the beverage discharged from a beverage supply circuit 7 described later via the nozzle 12. It is to be noted that in the present embodiment, the cup is described as the container, but this is not restrictive. For example, glass, dish or bucket may be used as long as the beverage can be received.

In the present embodiment, the beverage supply unit 3 has the beverage supply unit 3 including a syrup supply circuit (a diluted ingredient supply circuit) 72 which supplies an ingredient to be diluted to a carbonator 51; a diluting water supply circuit 74 which supplies diluting water to the carbonator 51; the carbonator 51; a heat exchanger 16 for supercooling the beverage; a beverage electromagnetic valve 10 and the like.

In the syrup supply circuit 72, a syrup tank (a diluted ingredient tank) 71 to store the syrup as the ingredient to be diluted, a syrup flow rate regulator 75 and a syrup cooling coil 9 are connected to one another via pipes, and the pipe exiting from the syrup cooling coil 9 is connected to the carbonator 51 via a syrup electromagnetic valve 76 controlled to open or close by the control device C. It is to be noted that the syrup in the syrup tank 71 is fed into the syrup supply circuit 72 via a gas regulator 73.

In the diluting water supply circuit 74, a raw water treatment device 70 which deaerates raw water (e.g., tap water) as the beverage ingredient for diluting the syrup into a concentration suitable for serving the targeted beverage (a targeted carbonated beverage) and/or which treats the raw water through a reverse osmosis film, a water pump 77, a diluting water flow rate regulator 78 and a diluting water cooling coil 79 are connected to one another via pipes, and the pipe exiting from the diluting water cooling coil 79 is connected to the carbonator 51 via a diluting water electromagnetic valve 80 controlled to open or close by the control device C.

The flow rate regulators 75, 78 can set a predetermined flow rate, and have a function of preventing a discharging flow rate fluctuation from being generated even in a case where a supply circuit pressure fluctuates for a certain cause. In consequence, the syrup or the diluting water is fed from the syrup tank 71 or the water pump 77 to the carbonator 51, and the supply of these syrup and diluting water is controlled.

Moreover, this carbonator 51 is connected to a carbonic acid gas cylinder 53 which supplies a pressurized carbonic acid gas via a gas supply line 52. A gas regulator 54 is interposed along the gas supply line 52.

The gas regulator 54 is means capable of changing the supply pressure of the pressurized carbonic acid gas supplied from the carbonic acid gas cylinder 53 with respect to the carbonator 51, and the regulator constitutes a carbonic acid gas source in the present invention. It is to be noted that the carbonic acid gas cylinder 53 is distributed on the market, and is usually separately connected to the beverage dispenser 1 in an installation place. However, the carbonic acid gas cylinder 53 supplies the pressurized carbonic acid gas to the carbonator 51 via the gas regulator 54, and the cylinder may constitute the carbonic acid gas source together with the gas regulator 54.

The carbonator 51 is constituted of a carbonator tank 56, and the gas supply line 52 for introducing the carbonic acid gas into the tank 56 is connected to the carbonator. A siphon tube 57 which extends upwardly from the lower part of the tank 56 so as to derive the carbonated beverage manufactured in the tank 56 is provided so as to communicate with the inside of the tank 56. There is also provided a water level sensor 58 for detecting the level of the carbonated beverage manufactured in the tank 56. The siphon tube 57 constitutes a part of a beverage supply circuit 7 described later.

The outlet end of the syrup supply circuit 72 and the outlet end of the diluting water supply circuit 74 are provided with nozzle portions 72A, 74A which pass through the upper surface of the tank 56 to extend into the tank 56 and whose tips have spray nozzles or small holes, respectively. In consequence, the syrup supplied from the syrup supply circuit 72 is sprayed or jetted via the nozzle portion 72A, and the diluting water supplied from the diluting water supply circuit 74 is sprayed or jetted via the nozzle portion 74A.

In the upper part of the tank 56, a container 59 is provided so that the outlet ends of the syrup supply circuit 72 and the diluting water supply circuit 74 are inserted from the upper surface of the container, and the container can communicate with the inside of the tank 56, whereby the container can be filled with the carbonic acid gas. Then, the side surface and bottom surface of this container 59 are provided with a plurality of outflow holes 60 from which the carbonated beverage formed in the container is discharged. The upper part of this tank 56 is provided with an exhaust valve 55 for discharging, from the tank 56, a gas such as air in the tank 56 or nitrogen or oxygen accumulated in the tank 56.

The syrup cooling coil 9 cools the syrup discharged from the syrup tank 71 to the temperature of the ice point or so, and the diluting water cooling coil 79 cools the diluting water supplied through the raw water treatment device 70 to the temperature of the ice point or so. In the present embodiment, the syrup cooling coil 9, the diluting water cooling coil 79, the carbonator 51 and a heat exchanger 61 for re-cooling described later in detail are arranged in the same water tank 17 constituting a primary cooling device (cooling means) 13 so as to perform heat exchange.

That is, the primary cooling device 13 includes the water tank 17 to receive cooling water and a refrigerant circuit 18 which cools the cooling water received in the water tank 17 and which attaches ice of a predetermined ratio of the cooling water to a cooler 22. The refrigerant circuit 18 is constituted by connecting, annularly via a refrigerant pipe 23, a compressor 19 arranged in the main body 2, a condenser 20, an expansion valve 21 as pressure reduction means and the cooler 22 arranged so as to perform the heat exchange between the cooler and the cooling water in the water tank 17.

Moreover, in the water tank 17, a stirring propeller 4 is provided which is driven by a stirring motor to stir the cooling water in the water tank. Moreover, the water tank includes a first ice sensor 26A including a pair of conducting wires positioned in the cooler 22, and a second ice sensor 26B including a pair of conducting wires positioned outside the cooler 22. These ice sensors 26A, 26B output an ice detection signal, when the ice is interposed between the conducting wires and a resistance value is a predetermined value or more.

On the other hand, the beverage supply circuit 7 (in actual, the siphon tube 57 constituting a part of the circuit 7) connected to the carbonator 51 is connected to the heat exchanger 61 for re-cooling which is positioned between the carbonator 51 and the heat exchanger 16 for supercooling described later and which constitutes a part of the beverage supply circuit 7.

In the present embodiment, the heat exchanger 61 for re-cooling is constituted of a cooling coil having a predetermined capacity (e.g., at least an amount to be supplied by the present device for one cup, a pipe length of about 10 m in the present embodiment).

On the other hand, the beverage supply circuit 7 on the downstream side of the heat exchanger 61 for re-cooling is provided with the heat exchanger 16 for supercooling (cooling means). This heat exchanger 16 for supercooling allows a secondary cooling device 30 to cool the carbonated beverage at a supercooling temperature which is a solidifying point or less. In the present embodiment, the heat exchanger is constituted with a double pipe. The double pipe is surrounded with an insulating material 34 or the like and constituted so that cold does not easily leak outwards.

Moreover, it is constituted that the carbonated beverage circulated through the carbonator 51 and the heat exchanger 61 for re-cooling flows into an inner pipe of this double pipe. It is to be noted that in the present embodiment, the inner pipe of the double pipe has such a capacity as to be filled with about one cup of the beverage in terms of the cup 5, for example, about 200 cc of carbonated beverage.

In the present embodiment, the secondary cooling device 30 includes an anti-freezing liquid circuit 31 through which an anti-freezing liquid (brine, for example) is circulated; and a refrigerant circuit 35 which cools the anti-freezing liquid in the anti-freezing liquid circuit 31 at the supercooling temperature which is the solidifying point or less of the carbonated beverage, for example, −5 degrees centigrade to −10 degrees centigrade.

The anti-freezing liquid circuit 31 is constituted by annually connecting an anti-freezing liquid circulation pump 32, the heat exchanger 16 for supercooling and an anti-freezing liquid tank 33, and the anti-freezing liquid circuit is filled with a predetermined amount of the anti-freezing liquid. The present embodiment is constituted so that the anti-freezing liquid flowing through the anti-freezing liquid circuit 31 flows between an outer pipe and the inner pipe of the double pipe constituting the heat exchanger 16 for supercooling. Further in the present embodiment, the pipes are connected so that the anti-freezing liquid is circulated in such a direction as to be opposite to a circulating direction of the carbonated beverage. In consequence, the anti-freezing liquid flows into the heat exchanger 16 for supercooling from the downstream side of the beverage supply circuit 7, and is discharged from the heat exchanger 16 on an upstream side of the beverage supply circuit 7.

The refrigerant circuit 35 is constituted by connecting, annularly via a refrigerant pipe 40, a compressor 36 arranged in the main body 2, a condenser 37, an expansion valve 38 as pressure reduction means and a cooler 39 arranged so as to perform heat exchange between the cooler and the anti-freezing liquid in the anti-freezing liquid tank 33.

Moreover, in the anti-freezing liquid tank 33 for supercooling, there are provided a temperature sensor 42 which detects the temperature of the anti-freezing liquid stored in the tank 33 and a stirring propeller 29 for achieving a uniform temperature of the anti-freezing liquid in the tank 33.

It is to be noted that FIG. 3 shows only one line of the syrup supply circuit 72 including the syrup tank 71, the syrup cooling coil 9 and the carbonator 51, and only one line of the beverage supply circuit 7 including the carbonator 51, the heat exchanger 61 for re-cooling, the heat exchanger 16 for supercooling and the beverage electromagnetic valve 10, respectively. However, this is not restrictive, and the syrup supply circuit 72 and the beverage supply circuit 7 are provided for each type of beverage indicated at the operating section 27. It is to be noted that in this case, the water tank 17 constituting the primary cooling device 13 is used in cooling the syrup cooling coil 9, the diluting water cooling coil 79, the carbonator 51 and the heat exchanger 61 for re-cooling. The anti-freezing liquid tank 33 constituting the secondary cooling device 30 may similarly be used in cooling the beverage supply circuit 7. However, it is preferable that the anti-freezing liquid circuit 31 is disposed for each of the supercooling heat exchangers 16 of the beverage supply circuits 7.

Figure 4:
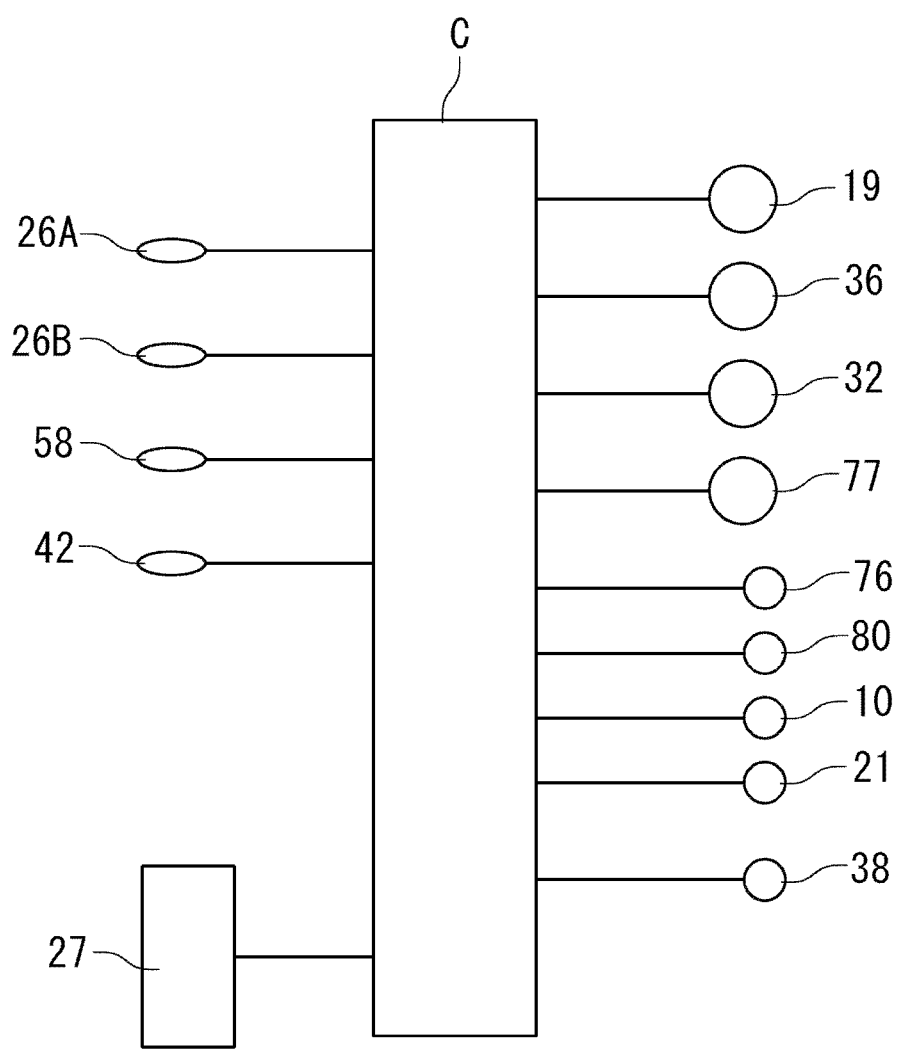
FIG. 4 is an electric block diagram of a control device.

Next, the control device C will be described with reference to the electric block diagram of FIG. 4. The control device C on an input side includes a microcomputer for general use, and is connected to the operating section 27, the first and second ice sensors 26A, 26B, the water level sensor 58 and the temperature sensor 42. The control device on an output side is connected to the syrup electromagnetic valve 76; the diluting water electromagnetic valve 80; the beverage electromagnetic valve 10; the water pump 77; the compressor 19 and the expansion valve 21 constituting the primary cooling device 13; the anti-freezing liquid circulation pump 32 constituting the secondary cooling device 30; and the compressor 36 and the expansion valve 38 constituting the refrigerant circuit 35.

The operation of the beverage dispenser 1 having the above constitution will be described.

(1) Preparation (Cooling) for Beverage Serving

First, the control device C achieves a beverage serving standby state, cools the cooling water in the water tank 17 of the primary cooling device 13, and cools the anti-freezing liquid in the anti-freezing liquid tank 33 of the secondary cooling device 30.

To cool the cooling water in the water tank 17, first the control device C operates the compressor 19 and the like of the primary cooling device 13, and allows the cooler 22 to perform a cooling function. In consequence, the refrigerant pipe constituting the cooler 22 cools the cooling water in the water tank 17, and further forms ice on the surface of the cooler 22. Moreover, it is judged based on the ice detection signals of the ice sensors 26A, 26B whether or not the ice sufficiently covers the cooling water stored in the water tank 17. Based on this judgment, the operations of the compressor 19 and the like of the primary cooling device 13 are controlled. Therefore, the syrup cooling coil 9, diluting water cooling coil 79, carbonator 51 and heat exchanger 61 for re-cooling immersed into the cooling water stored in the water tank 17 are cooled to a temperature of the ice point or so, and the beverage circulated through these components is also cooled to the temperature of the ice point or so.

To cool the anti-freezing liquid in the anti-freezing liquid tank 33, first the control device C operates the compressor 36 and the like constituting the secondary cooling device 30, and allows the cooler 39 to perform the cooling function. In consequence, the anti-freezing liquid in the anti-freezing liquid tank 33 is cooled. Then, based on the detected temperature of the temperature sensor 42, the operations of the compressor 36 and the like of the secondary cooling device 30 are controlled so that the anti-freezing liquid in the anti-freezing liquid tank 33 is cooled at a predetermined cooling temperature of about −5 degrees centigrade to −8 degrees centigrade in the present embodiment. Therefore, the anti-freezing liquid in the anti-freezing liquid tank 33 is constantly cooled at the cooling temperature of about −5 degrees centigrade to −8 degrees centigrade.

(2) Preparation for Beverage Serving (Carbonation)

While a cooling operation is performed as described above, the control device C allows the water level sensor 58 of the carbonator 51 to detect the level of the beverage ingredients in the carbonator 51. When a predetermined water level is not satisfied, the diluting water and the syrup are supplied to execute the manufacturing of the carbonated beverage.

First, the diluting water electromagnetic valve 80 is opened, and the water pump 77 allows the tap water treated in the raw water treatment device 70 to flow into the carbonator 51 via the diluting water supply circuit 74 provided with the diluting water flow rate regulator 78 and the diluting water cooling coil 79.

Simultaneously, the control device C opens the syrup electromagnetic valve 76. In consequence, the gas regulator 73 is constantly opened, whereby the syrup electromagnetic valve 76 positioned on the downstream side of the syrup supply circuit 72 is opened to supply the carbonic acid gas having a predetermined pressure from the carbonic acid gas cylinder 53. The syrup is fed to the syrup supply circuit 72. In consequence, the syrup supplied from the syrup tank 71 is allowed to flow into the carbonator 51 via the syrup supply circuit 72 provided with the syrup flow rate regulator 75 and the syrup cooling coil 9.

At this time, the control device C controls the opening/closing of the diluting water electromagnetic valve 80 and the syrup electromagnetic valve 76, whereby the syrup supplied to the carbonator 51 is diluted into a beverage ingredient having a predetermined concentration with the diluting water at a predetermined ratio.

It is to be noted that in this case, the carbonic acid gas having a predetermined pressurizing pressure (e.g., 0.15 MPa) is supplied into the carbonator 51 via the gas supply line 52 along which the gas regulator 54 is interposed, whereby the carbonator is filled with the carbonic acid gas having the pressurizing pressure.

Therefore, in this state, the syrup electromagnetic valve 76 and the diluting water electromagnetic valve 80 are opened, whereby the syrup supplied from the syrup supply circuit 72 is sprayed or jetted from the nozzle portion 72A opened in the tank 56, and the diluting water supplied from the diluting water supply circuit 74 is sprayed or jetted from the nozzle portion 74A opened in the tank 56.

In consequence, the sprayed or jetted syrup and diluting water are is mixed with the carbonic acid gas with which the tank 56 has been filled, and the carbonic acid gas is dissolved in the syrup diluted with the diluting water. At this time, the syrup and diluting water are sprayed or jetted into the container 59, so that the syrup and diluting water are mixed and circulated through the container 59. In this process, the carbonic acid gas is sufficiently dissolved in the beverage ingredients, and the saturated carbonated beverage is manufactured with the pressure.

In this case, the carbonator 51 (the carbonator tank 56) can secure a space required for mixing the carbonic acid gas, the syrup as the ingredient to be diluted and the diluting water, and the carbonated beverage can efficiently be manufactured with a predetermined syrup concentration and a predetermined gas volume value.

Moreover, the carbonic acid gas, the syrup and the diluting water are simultaneously mixed in the carbonator 51, so that any special means (e.g., a tank for mixing) for mixing the syrup and the diluting water does not have to be provided, and the carbonated beverage having the predetermined concentration can precisely be manufactured.

In particular, in the present embodiment, the syrup supplied to the carbonator 51 is cooled to the ice point or so in the water tank 17 of the primary cooling device 13 in a process in which the syrup is circulated through the syrup cooling coil 9. Similarly, the diluting water supplied to the carbonator 51 is cooled to the ice point or so in the water tank 17 in a process in which the water is circulated through the diluting water cooling coil 79, whereby temperature conditions in the carbonator 51 can be constant.

Therefore, the pressurizing pressure (the supply pressure) of the carbonic acid gas from the gas regulator 54 constituting the carbonic acid gas source to the carbonator 51 is set to a constant pressure, whereby the carbonated beverage having a predetermined gas volume can appropriately be manufactured.

Then, the beverage ingredients (the carbonated beverage ingredients, the carbonated beverage) in which the carbonic acid gas has been dissolved in the container 59 are discharged from the outflow holes 60 formed in the side and bottom surfaces of the container 59, and received in the tank 56. In consequence, the carbonated beverage having a predetermined high gas volume is stored in the tank 56. It is to be noted that at this time, the carbonated beverage ingredients are once received in the container 59, and then gradually stored in the lower part of the tank 56 from the outflow holes 60. Owing to this constitution, it is possible to suppress a disadvantage that the carbonated beverage stabilized in the lower part of the tank 56 is again activated by the sprayed or jetted syrup or the like.

Afterward, when the water level sensor 58 detects a full water level, the control device C closes the syrup electromagnetic valve 75 and the diluting water electromagnetic valve 80, thereby ending the carbonation.

(3) Standby for Beverage Serving

Here, the carbonator 51 is arranged in the water tank 17 cooled by the primary cooling device 13, so that the carbonated beverage manufactured in the carbonator 51 is cooled at a predetermined cooling temperature of the ice point or so in the present embodiment.

The above carbonation ends, and the cooling water in the water tank 17 is cooled to the temperature of the ice point or so. After it is detected that the anti-freezing liquid in the anti-freezing liquid tank 33 has been cooled at the predetermined cooling temperature, the control device C obtains a state in which the carbonated beverage can be dispensed, that is, a state in which the operation buttons provided in the operating section 27 to supply the beverages can be operated.

(4) Beverage Serving

In such a state, when any operation button provided in the operating section 27 is operated, the control device C drives the anti-freezing liquid circulation pump 32 of the anti-freezing liquid circuit 31 which cools the corresponding beverage supply circuit 7. With a delay of a predetermined time (heat exchanger cooling standby time) of, for example, about five seconds after the circulation pump 32 has been driven, the corresponding beverage electromagnetic valve 10 is opened.

At this time, the beverage electromagnetic valve 10 is opened, whereby the carbonic acid gas in the carbonic acid gas cylinder 53 is set to a predetermined pressure by the gas regulator 54, and supplied to the carbonator 51, whereby the carbonated beverage stored in the carbonator 51 is fed to the beverage supply circuit 7 provided with the heat exchanger 61 for re-cooling.

Therefore, the carbonated beverage in the carbonator 51 flows into the heat exchanger 61 for re-cooling, and the carbonated beverage is stabilized in a process in which the beverage is circulated through the heat exchanger 61. At this time, the carbonated beverage flows from the carbonator 51 into the heat exchanger 61 for re-cooling to push out, to the heat exchanger 16 for supercooling, the carbonated beverage with which the heat exchanger 61 for re-cooling has been filled, whereby a standby state for the next carbonated beverage serving is achieved.

The carbonated beverage which has flowed into the inner pipe of the double pipe of the heat exchanger 16 for supercooling in this manner performs heat exchange between the beverage and the anti-freezing liquid circulated through the anti-freezing liquid circuit 31 and cooled at a supercooling temperature of −5 degrees centigrade to −8 degrees centigrade, whereby the carbonated beverage is cooled at the supercooling temperature.

It is to be noted that as in the present embodiment, after an instruction for serving the beverage is performed, the anti-freezing liquid circulation pump 32 is first driven, and the beverage electromagnetic valve 10 is opened after the delay, until the heat exchanger cooling standby time elapses. In consequence, the carbonated beverage with which the beverage supply circuit 7 in the heat exchanger 16 for supercooling is filled can appropriately be cooled at a carbonated beverage supercooling temperature of −5 degrees centigrade to −8 degrees centigrade.

Thus, the carbonated beverage cooled to the ice point or so by the carbonator 51 and the heat exchanger 61 for re-cooling arranged in the water tank 17 of the primary cooling device 13 performs the heat exchange between the beverage and the anti-freezing liquid cooled to the solidifying point or less of the beverage in the heat exchanger 16 for supercooling. In consequence, the carbonated beverage can efficiently be cooled into the supercooled state at the solidifying point or less of the beverage in a short time.

In the heat exchanger 16 for supercooling, the carbonated beverage cooled at the supercooling temperature of the carbonated beverage is brought into the supercooled state. Therefore, owing to impact in a case where the beverage is discharged from the nozzle 12 into a container such as the cup 5, the carbonated beverage can immediately be phase-changed to the ice, and the carbonated beverage can be served in the finally served state which is the sherbet state.

It is to be noted that in the present embodiment, the syrup and the diluting water are set to a constant temperature. In actual, in a state in which the syrup and the diluting water are cooled to the ice point or so by the syrup cooling coil 9 and the diluting water cooling coil 79 in the water tank 17 of the primary cooling device 13, the syrup and the diluting water are supplied to the carbonator 51 to manufacture the carbonated beverage. Therefore, as described above, the gas volume of the carbonated beverage can be set to a constant volume.

Therefore, it is possible to avoid in advance a disadvantage that bubble is generated in the carbonated beverage to form the ice nucleus and that the supercooled state is released in the heat exchanger 16 for supercooling to cause the freezing in a process of cooling the beverage to the temperature of the solidifying point or less of the beverage in the heat exchanger 16 for supercooling.

It is to be noted that the supply pressure of the carbonic acid gas to the carbonator 51 in the present embodiment can arbitrarily be changed by the gas regulator 54. In consequence, in a case where the carbonated beverage is manufactured in the carbonator 51, the supply pressure of the carbonic acid gas with which the tank 56 is filled can be changed to change the gas volume value (a gas absorption ratio) of the manufactured carbonated beverage.

Figure 5:
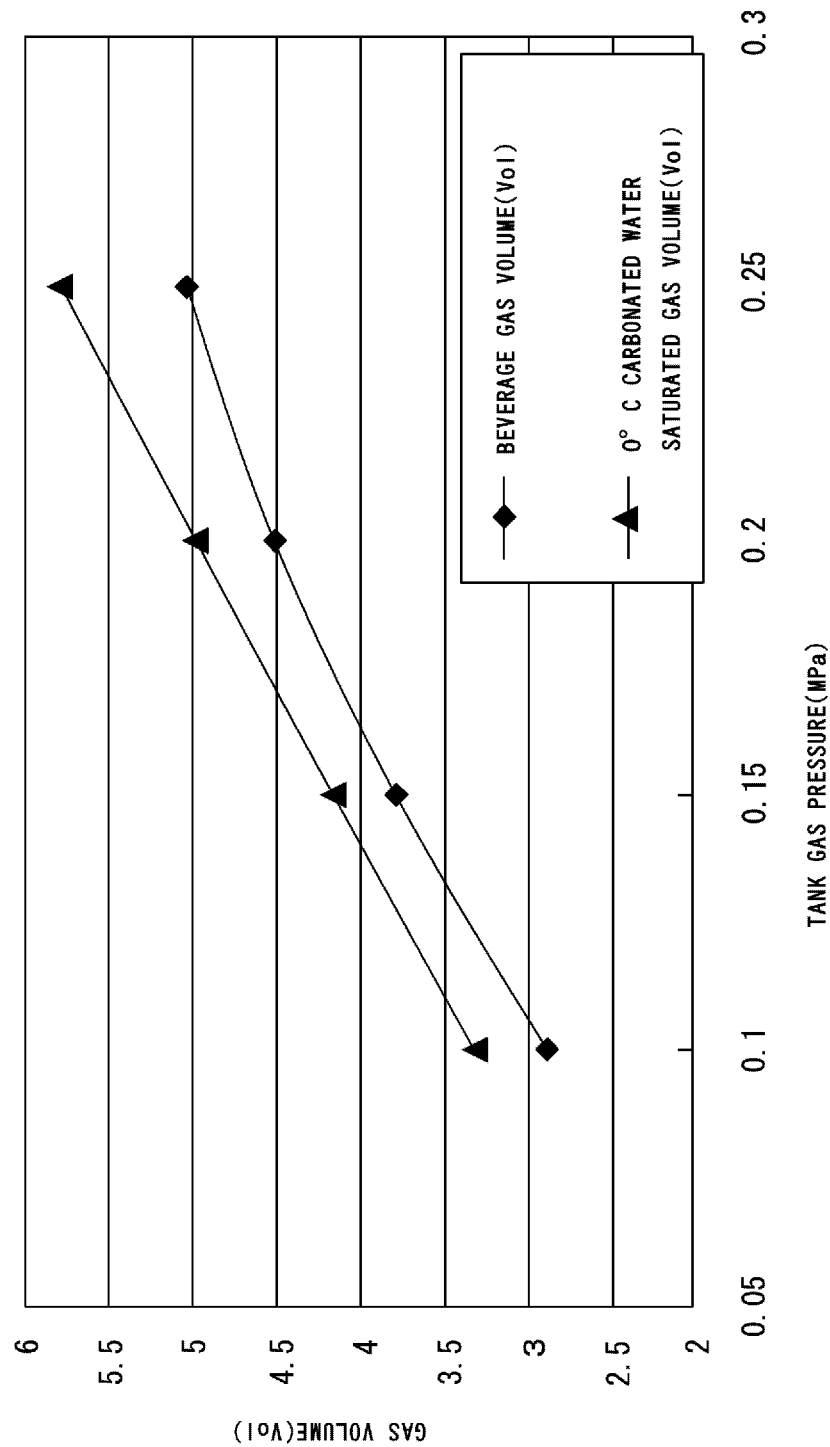
FIG. 5 is a diagram showing a gas volume value of a manufactured carbonated beverage with respect to a supply pressure.

FIG. 5 shows the gas volume value of the manufactured carbonated beverage with respect to the pressure of the carbonator tank 56. The drawing shows experiment values in a case where a carbonated beverage is manufactured from beverage ingredients constituted by mixing syrup and diluting water at a predetermined ratio, and a ratio at which a carbonic acid gas is dissolved in water at 0 degrees centigrade, by use of Table 1.4 of a carbonic acid gas absorption coefficient table of a book titled "Soft Drinks" issued by Korin Publishing Co., Ltd.

According to this graph, when the pressure in the tank 56 is 0.1 MPa, the gas volume value of the carbonated beverage is 2.9 vol, and that of carbonated water is 3.37 vol. When the pressure in the tank 56 is 0.15 MPa, the gas volume value of the carbonated beverage is 3.77 vol, and that of the carbonated water is 4.20 vol. When the pressure in the tank 56 is 0.2 MPa, the gas volume value of the carbonated beverage is 4.5 vol, and that of the carbonated water is 5.03 vol. When the pressure in the tank 56 is 0.25 MPa, the gas volume value of the carbonated beverage is 5.03 vol, and that of the carbonated water is 5.86 vol.

The supply pressure to the carbonator tank 56 in a case where the carbonation is performed is increased in this manner, whereby the gas volume value of the manufactured carbonated water/carbonated beverage can be increased.

In consequence, the supply pressure to the carbonator 51 can be changed to change the gas volume value of the carbonated beverage in the sherbet state as the finally served state, whereby the diversification of the beverage to be served can be realized.

REFERENCE SIGNS LIST

C control device
1 beverage dispenser
5 cup (container or the like)
7 beverage supply circuit
9 syrup cooling coil
10 beverage electromagnetic valve
12 nozzle
13 primary cooling device (cooling means)
16 heat exchanger for supercooling (cooling means)
17 water tank
30 secondary cooling device
31 anti-freezing liquid circuit
32 anti-freezing liquid circulation pump
33 anti-freezing liquid tank
51 carbonator
52 gas supply line
53 carbonic acid gas cylinder
54 gas regulator (carbonic acid gas source)
59 container
71 diluted ingredient tank
72 syrup supply circuit (diluted ingredient supply circuit)
72A, 74A nozzle portion
73 gas regulator
74 diluting water supply circuit
75 syrup flow rate regulator
76 syrup electromagnetic valve
78 diluting water flow rate regulator
79 diluting water cooling coil
80 diluting water electromagnetic valve

The invention claimed is:

1. A beverage dispenser, comprising:
a carbonator that mixes a carbonic acid gas from a carbonic acid gas source, an ingredient to be diluted, and water to provide a carbonated beverage;
a beverage supply circuit that supplies the carbonated beverage to the outside;
a cooling means that cools the carbonated beverage flowing through the beverage supply circuit into a supercooled state at a temperature of a solidifying point or less to release the supercooled state to the outside; and
a primary cooling device that cools the ingredient to be diluted, the water, and the carbonated beverage to a temperature of an ice point or so,
wherein the cooling means includes a heat exchanger for supercooling that cools the carbonated beverage flowing through the beverage supply circuit into the supercooled state at the temperature of the solidifying point or less.

2. The beverage dispenser according to claim 1, further comprising:
an ingredient supply circuit that supplies the ingredient to be diluted to the carbonator; and
a diluting water supply circuit that supplies the diluting water to the carbonator,
wherein the primary cooling device cools, to the ice point or so, the ingredient to be diluted in the ingredient supply circuit and the diluting water in the diluting water supply circuit.

3. The beverage dispenser according to claim 2, wherein a supply pressure from the carbonic acid gas source to the carbonator is varied.

4. The beverage dispenser according to claim 2, wherein the beverage supply circuit further comprises a heat exchanger for re-cooling.

5. The beverage dispenser according to claim 2, further comprising:
an anti-freezing liquid tank;
a temperature sensor of the anti-freezing liquid tank; and
a refrigerant circuit that cools anti-freezing liquid in the anti-freezing liquid tank to a predetermined temperature of less than about −5 degrees centigrade, based on a temperature detected by the temperature sensor.

6. The beverage dispenser according to claim 2, further comprising:
a water tank; and
a propeller that stirs water within the water tank,
wherein the ingredient supply circuit and the diluting water supply circuit are cooled to the ice point or so within the water tank, and water within the water tank is cooled to the ice point or so by the primary cooling device.

7. The beverage dispenser according to claim 6, wherein the water tank further comprises first and second temperature sensors comprising conducting wires that detect ice when a resistance value between the conducting wires is a greater than or equal to a predetermined value.

8. The beverage dispenser according to claim 1, wherein the cooling means comprises a double pipe surrounded by an insulating material.

9. The beverage dispenser according to claim 1, further comprising a water treatment device that deaerates the water for the carbonated beverage.

10. A beverage dispenser, comprising:
   a carbonator that mixes a carbonic acid gas from a carbonic acid gas source, an ingredient to be diluted, and water to provide a carbonated beverage;
   a primary cooling device that cools the carbonated beverage to a temperature of an ice point or so;
   a beverage supply circuit that supplies the carbonated beverage to the outside; and
   a heat exchanger that cools the carbonated beverage flowing through the beverage supply circuit into a super-cooled state at a temperature of a solidifying point or less,
   wherein the primary cooling device further cools the ingredient to be diluted and the water to the temperature of an ice point or so.

11. The beverage dispenser according to claim 10, further comprising:
   an ingredient supply circuit that supplies the ingredient to be diluted to the carbonator; and
   a diluting water supply circuit that supplies the diluting water to the carbonator,
   wherein the primary cooling device cools, to the ice point or so, the ingredient to be diluted in the liquid material supply circuit and the diluting water in the diluting water supply circuit.

12. The beverage dispenser according to claim 11, further comprising:
   an anti-freezing liquid tank;
   a temperature sensor of the anti-freezing liquid tank; and
   a refrigerant circuit that cools anti-freezing liquid in the anti-freezing liquid tank to a predetermined temperature of less than about −5 degrees centigrade, based on a temperature detected by the temperature sensor.

13. The beverage dispenser according to claim 11, further comprising:
   a water tank; and
   a propeller that stirs water within the water tank,
   wherein the ingredient supply circuit and the diluting water supply circuit are cooled to the ice point or so within the water tank, and water within the water tank is cooled to the ice point or so by the primary cooling device.

14. The beverage dispenser according to claim 13, wherein the water tank further comprises first and second temperature sensors comprising conducting wires that detect ice when a resistance value between the conducting wires is a greater than or equal to a predetermined value.

15. A beverage dispenser, comprising:
   a mixer that mixes a carbonic acid gas, an ingredient to be diluted, and water to provide a carbonated beverage;
   a beverage supply circuit that supplies the carbonated beverage to the outside;
   a heat exchanger that cools the carbonated beverage flowing through the beverage supply circuit into a super-cooled state at a temperature of a solidifying point or less; and
   a primary cooling device that cools the ingredient to be diluted and the water to the temperature of an ice point or so.

16. The beverage dispenser according to claim 15, further comprising:
   an ingredient supply circuit that supplies the ingredient to be diluted to the mixer; and
   a diluting water supply circuit that supplies the diluting water to the mixer,
   wherein the primary cooling device cools, to the ice point or so, the ingredient to be diluted in the liquid material supply circuit and the diluting water in the diluting water supply circuit.

17. The beverage dispenser according to claim 16, further comprising:
   a water tank; and
   a propeller that stirs water within the water tank,
   wherein the ingredient supply circuit and the diluting water supply circuit are cooled to the ice point or so within the water tank, and water within the water tank is cooled to the ice point or so by the primary cooling device.

* * * * *